(12) United States Patent
Curtis

(10) Patent No.: X2602
(45) Date of Patent: May 28, 1816

(54) LOOM, WATER

(76) Inventor: Philo Clinton Curtis

Philo Clinton Curtis
Letters Patent

The Schedule referred to in these Letters Patent and
making part of the same containing a description in the
words of the said Philo Clinton Curtis himself of his improve
ment in the Water Loom. — — — —
The body or frame of the loom is composed simply of four
pieces of timber two of which I term the end pieces
and two the side pieces or bars, two end pieces are propor-
tioned in length to the width that is necessary to be wove
and have a mortice in each end to receive the side bars
in the centre of each end piece there is a tenon that enters
the mortice in the end pieces so that when put together they
will form a square or an oblong square the frame may be
either pinned or secured together with joint bolts; on or near
the centre of this frame I place a wheel the Diameter of which
is large enough to slide on to the frame, within this wheel I hang
two rollers which supports the harness for springing the web
within this frame and near each end I place the cloath and
yarn beams or Rollers within the wheel and between the cloath
and yarn beams, I hang the lathe or batten on rods or in a
groove and let it slide parallel with the loom or side bars
between the yarn and cloth beams I place two rollers or rods
which may be wound with wire or formed into a screw
in any other way to the right and left from the centre of the loom.
between the lathe and cloath roller which serves for templing
the cloath: to operate the lathe there is a roller placed in
back of the yarn beams that extends from side to side of the
frame and has a lever in the centre that is operated upon
by a circular inclining part of the loom there is a connection
from the lathe to the roller at each end of the lathe by two pit
mans. that are connected to two short levers in the end
of the roller as the levers are operated upon by the inclined
plane it draws the lathe back as far as is necessary to let the
shuttle pass and then continues on a circular line parallel
with the end of the loom a sufficient length of time for the shut-
tle to drop through the [illegible] when there is a sudden offset in
the plane which allows the spring which operates the lathe to
drive it up the spring may be fastened on the centre of the
end piece and allowed to extend over the yarn beam
on a circle to a piece that crosses from one side of the lathe to the
other back of the harness the rollers which serve as temples may
be moved by a short lever in the roller that moves the lathe
to operate upon a slide that reaches to the temple rollers
and has a hand or pall on the end to operate in a ratchet
wheel that is on the temple roller or rod so as to turn it a-
round and spread the clouth each way from the centre.
I place two small wheels on these rollers near the end with
teeth that make into each other so that turning the one
turns them both; for holding the shuttle, I have two boxes by the
side of the wheel over a mortice threw the side barr of the loom
which boxes are long enough to receive the shuttle; over the end
of the box there is a slide that is connected to a short lever
on the side barr that rests on pivots, on the end of this lever
farthest from the box there is a spring of such strength that
the weight of the shuttle when it stands perpendicular will
over power it and allow the lathe to pass over the end
thereof and prevent it from passing out of the box until
the loom has turned and drawn the lathe back and raised
the shuttle up so that its own weight will cause it to pass
three the [illegible], the lever that is operated upon by the shuttle
answers the purpose of stopping the loom if the shuttle fails
of dropping into the box the spring on the end of the lever will
hold that end out from the frame so that when it passes
to a certain place it will unlatch the sliding pulley
which which [illegible] the strap that passes around the big wheel and
stop the loom; in order to spring the webb there may be two
shafts and two pullies within the wheel above the rollers that
support the harness which shafts may be supported by the wheel,
on one end of each of these shafts there is a lever that extends
to the out edge of the wheel there is a circle part way around
the large wheel that is fastened to the out side frame that
supports the loom which these levers alternately slide
upon there is a connection from the pullies to the harness
rollers by a cord strap or chain so that when one of the
levers [illegible] upon the circle it draws the other back and
springs the webb, in order to hold the webb and take it
up as it is wove I place on one end of the cloath roller
and yarn beam a wheel with teeth or cogs the one on
the cloath roller turns loose and the roller is turned with
a cord that is fastened to a pin in the wheel on the rol-
ler and is wound a number of times around the rol
ler and fastened to the pin again, by means of spring grad-
uating screw lengthwise of the loom I have a rod that
has two screws or worms on it one to each wheel on the
beams so that by turning the rod it lets down the webb
and takes up the cloath, on one end of the rod that has
the worms or screws on I place two ratchet wheels one of which
is permanantly attached to the rod and which I term the
taking up wheel the other which is near the former moves round
the rod being prevented however from changing its position
unless operated upon by the hand or pall by means of a
clamp or spring fixed to the side of the loom the palls
or hands which act upon these ratchet wheels are sepa-
rated by a short lever or stud in the roller that operates
the lathe they are kept down upon the wheels by means of
springs and have a cord or communication rising from
one of them to the end of a vertical brake and descending
from from the opposite end of said brake to the other pall or hand
so that when one hand is depressed by the spring into the notch
of its ratchet wheel one only of the hands or palls acting upon
its wheel at one time; the mode in which these ratchet which
moves round the rod has its periphery so divided into teeth
that the full swing of the lathe just draws the pall or
hand so far back as to remove it one notch and suffer
the hand to fall therein and so as to keep the other
pall or hand which would act upon the taking up
wheel out of the teeth thereof when however so much
of the web is woven that the lathe cannot have its
full swing the pall or hand does not enter the notch in
the moving ratchet wheel but will fall into the notches
thereof and the moving backward of the lathe will pro-
pell the ratchet wheel by means of the hand or pall
and so much of the web will be wound upon the rol-
lers as will allow the lathe bottom again to have it
full swing and the hand or the moveable ratchet wheel
to have its operations the frame calculated to support
this loom may be simply posts set in the building where
it is used for the pivots to rest and turn in or a frame
calculated for that purpose the box for the shuttles
may be either attached to the lathe and move with it
or fastened to the side pieces or bars of the loom the spring
to drive the lathe may be in any form best calculated
for the business to be performed the power applied to these
looms may be done either by strap round the big wheel
on the loom or by a winch or one of the bearings. the
power employed to move these looms may be eith-
er manual or that of horses wind water or steam as
shall be thought most convenient in the factories where
they shall be introduced Witnesses Noel Jones
[illegible] John Curtis Philo C Curtis